Patented Sept. 16, 1941

2,256,391

UNITED STATES PATENT OFFICE 2,256,391

METHOD FOR PREPARING OXIDIZED CELLULOSE

Gordon D. Hiatt, Rochester, N. Y., assignor to Eastman Kodak Company, Rochester, N. Y., a corporation of New Jersey No Drawing. Application December 5, 1940, Serial No. 368,662

5 Claims. (Cl. 260—212)

This invention relates to the oxidation of cellulose in which alcohol groups are oxidized to carboxyl groups by means of liquid nitrogen tetroxide containing 5–15% of $HNO_3$. This invention involves a useful method of preparing an oxidized cellulose of the nature of that claimed by Yackel and Kenyon in application Serial No. 219,464, filed July 15, 1938. In that application the process described involves the treatment of cellulose with gaseous $NO_2$ at a restricted temperature until the cellulose is alkali-soluble. By this means alcohol groups are oxidized to carboxyl groups so that the resulting product is a polycarboxyl compound.

An object of the present invention is to provide a method of preparing an oxidized cellulose of this nature in which the $NO_2$ is employed in liquid form. Another object of my invention is to provide a process for preparing an oxidized cellulose in which the crude liquid $NO_2$ from the recovery of nitric acid in a nitrating plant can be utilized in the process. A further object of my invention is to provide a simple and practical method for preparing oxidized cellulose which is soluble in dilute alkali and has a high $CO_2$ equivalence, which method requires less attention and less complicated apparatus than has formerly been employed in a process of this nature.

The prior art would seem to indicate that the treatment of cellulose with liquid $NO_2$ alone, instead of oxidizing it, nitrates the cellulose. For instance, in U. S. Patent No. 1,917,400 cellulose is treated with liquid $NO_2$ for a time and a considerable amount of nitration occurs. I have found, however, that when cellulose is treated with a mixture of liquid $NO_2$ and 5–15% of nitric acid, it is oxidized to a polycarboxyl compound and substantially no nitration occurs. By substantially no nitration is meant that the amount of nitrogen, if any, added to the cellulose is so small that analysis fails to show a nitrogen content of as much as one percent. This oxidation is carried out with a liquid free of materials which would promote nitration. For instance, neither acetic anhydride nor sulfuric acid should be present. I have found that by allowing cellulose to remain in a liquid essentially consisting of liquid $NO_2$ and a small proportion of $HNO_3$ for a time, that a product soluble in dilute alkali (aqueous sodium hydroxide of 2% concentration) is obtained. It is necessary that the so-treated cellulose have a carboxyl content of 11.5% or more to obtain complete solubility. With carboxyl contents appreciably less than that, only partial solubility is obtained. With an oxidized cellulose, having a carboxyl content near to but not quite 11.5%, the product will dissolve, except for possibly a few fibers. If, however, the carboxyl content is considerably below 11.5%, a considerable proportion of undissolved material will be present. As the oxidized cellulose prepared by my invention is ordinarily useful because of its alkali solubility, sufficient oxidation to give a carboxyl content of at least 11.5% is desirable.

Ordinarily, approximately 7 hours is required to obtain an oxidized cellulose having a carboxyl content of 11.5%. If an oxidized cellulose is desired, having a carboxyl content of approximately 13%, the treatment with the mixture of liquid $NO_2$ and nitric acid should ordinarily be nearly 10 hours. To obtain a product having a carboxyl content of approximately 15%, a time of treatment of about 12 hours is desirable. For a product having a carboxyl content of approximately 18–19%, the treatment should be for approximately 20–25 hours. A longer time of treatment will result in further increase of carboxyl. These figures are merely representative and may vary somewhat with varying conditions. When all of the primary alcohol groups of a cellulose are oxidized to carboxyl groups, the material analyzes 25.6% carboxyl. In actual practice, however, this theoretical amount is approached but has not been reached. The products in which the highest degree of oxidation has been obtained contain 20–23% carboxyl. Since ordinarily, alkali solubility is all that is desired, continued oxidation, after good alkali solubility has been reached, serves no useful purpose. In this application where terms such as "$NO_2$" and nitrogen tetroxide are employed, they refer to either $NO_2$ or its dimer $N_2O_4$ or a mixture of the two.

My process is carried out by wetting cellulose with liquid $NO_2$ containing 5–15% of nitric acid and allowing it to stand until the desired degree of oxidation is obtained, usually for at least 7 hours. It is more desirable to use at least four parts of this mixture to every part of cellulose to insure proper wetting of the cellulose. Any amount of this mixture above four parts per part of cellulose may be employed. However, the use of more than six parts is wasteful and, therefore, 4–6 parts is the preferred range. If some type of mixer is employed which insures intimate mixing of the liquid and the cellulose, the use of less than four parts of liquid would not be objectionable, the only criterion being that sufficient liquid is used to wet substantially all of the cellulose.

After the cellulose and liquid are intimately mixed, the mix is allowed to stand for the desired time at any suitable temperature. Any temperature between the solidifying point of the mass and the boiling point of the NO₂ may be employed. Obviously, it would be impractical to carry out the process at or above the boiling point of the NO₂ due to the evolution of gas which must be taken care of. In carrying out the process, it is ordinarily desirable either to use a closed vessel, which will withstand any pressure which might be generated in the reaction, or to equip the vessel with a good refluxing apparatus so that the NO₂ does not escape. If, however, economy is no object, the process might be carried out in a container having a small opening which is open to the air, particularly where the temperature is kept low so that the NO₂ does not escape in appreciable quantities. The reaction may be carried out in the complete absence of water, or a small amount of moisture may be present. It is preferable, however, to keep the moisture low, for example not more than 3% of moisture. The crude NO₂, which is ordinarily employed in my process, is inherently anhydrous and, therefore, any moisture, which may be present as my process is ordinarily carried out, would be that supplied by the cellulose.

As pointed out before, the liquid, which I have found quite suitable for use and which I prefer to employ, is the crude NO₂ from the acid recovery part of a nitrating plant. When the spent acid in such a plant is distilled to separate the nitric acid from the sulfuric acid or other foreign materials, the distillate, which comes over, essentially consists of NO₂ and nitric acid. The amount of nitric acid which is compatible with liquid NO₂ is limited and therefore the distilled crude recovered acid forms into two layers, the upper layer consisting of NO₂ containing the maximum amount of nitric acid which forms a homogeneous mixture therewith. At 11° C. the percentage of nitric acid which will be present in this layer is between 6% and 7%, while at 18° C. the percentage is approximately 8%. This upper layer may be separated off and used for oxidizing cellulose in accordance with my invention.

It is often desirable to employ a greater percentage of nitric acid than will form a homogeneous solution of HNO₃ in the liquid NO₂. For instance, a percentage of HNO₃ up to 15% has been found suitable for use in the oxidizing liquid employed to oxidize cellulose in accordance with my invention. In that case it is desirable to thoroughly mix, at least the excess, HNO₃ with the oxidizing liquid shortly before putting it on the cellulose so that an intimate mixture of the HNO₃ and liquid NO₂ is obtained.

If the upper layer from the distilled recovered nitrating acid from the acid recovery part of a nitrating plant is used and a greater proportion of nitric acid, than is there present, is desired in the oxidizing liquid, either a small amount of the liquid forming the lower layer of the distilled acid or nitric acid per se may be added. I have found, however, that at least 5% of nitric acid should be present in the NO₂ with which the cellulose is treated to inhibit any appreciable degree of nitration of the cellulose.

After the cellulose has been treated the desired time, it may be aerated so that the NO₂ may be driven off. Any NO₂ and nitric acid remaining may then be removed by thoroughly washing the oxidized cellulose with water. The resulting product has a carboxyl content the degree of which depends primarily on the time of treatment.

In my process the cellulose, which is employed, should be in a physical condition that allows of easy penetration of the liquid thereto, such as a fluffed condition. I have employed cotton linters, cotton and wood pulp in fluffed condition and have found all of these various types of cellulose to be suitable for use in my process. If the cellulose is so compact that the oxidizing liquid has difficulty in penetrating therein, the oxidation is non-uniform and ordinarily uniformity is desirable. However, if non-uniformity is not objectionable, cellulose in compact form may also be oxidized by my process.

The following examples illustrate my invention:

*Example I*

Five grams of cotton linters, containing 2–3% of moisture, was added to 25 cc. of liquid NO₂ containing 5% of nitric acid. This mixture was maintained at 23° C. for 7 hours with consequent loss of oxides of nitrogen. The product was aerated and washed with distilled water to remove all trace of the reaction mixture. This oxidized cotton which was completely soluble in aqueous sodium hydroxide solution of 2% concentration contained 13.4% carboxyl.

*Example II*

One part of cotton linters was added to five parts of a mixture of liquid NO₂ and 5% nitric acid and was mixed so that the cotton was thoroughly wet. The mass was kept at a temperature of 8° C. for 24 hours. The product was then aerated and thoroughly washed. It exhibited solubility in aqueous sodium hydroxide of 2% concentration and was found to contain 16.5% of carboxyl.

*Example III*

Three pounds of oven-dried cotton linters was thoroughly mixed with 13 pounds of a mixture consisting of 90% of N₂O₄ and 10% of HNO₃ to thoroughly wet the fibers. This mixture was pressed into a closed crock and allowed to stand at 14–24° C. for 25 hours. The washed and purified material from this reaction analyzed 20% carboxyl. The fibers were completely soluble in 2% alkali.

The oxidized cellulose prepared in accordance with my invention may be employed in any connection for which a material of this type is suitable, as disclosed in the Yackel and Kenyon application Serial No. 219,464. These oxidized celluloses, having a carboxyl content, may be combined with bases, either organic or inorganic, to form salts or esters, as desired.

I claim:

1. A method of preparing an oxidized cellulose in which alcohol groups of the cellulose are oxidized to carboxyl groups by treating the cellulose with at least approximately 4 parts of a mixture essentially consisting of liquid NO₂ and 5–15% of nitric acid.

2. A method of preparing an oxidized cellulose in which alcohol groups of the cellulose are oxidized to carboxyl groups by treating the cellulose with 4–6 parts of a mixture essentially consisting of liquid NO₂ and 5–15% of nitric acid.

3. A method of preparing an oxidized cellulose in which alcohol groups of the cellulose are oxidized to carboxyl groups which comprises subjecting the cellulose to a fluffing treatment and subsequently treating it for at least 7 hours with at least 4 parts of a mixture essentially consisting of liquid $NO_2$ and 5-15% of nitric acid.

4. A method of preparing an oxidized cellulose in which alcohol groups of the cellulose are oxidized to carboxyl groups by allowing the cellulose to stand mixed with at least 4 parts of liquid $NO_2$ containing 5-15% of nitric acid until the cellulose is completely alkali soluble.

5. A method of preparing an oxidized cellulose in which alcohol groups of the cellulose are oxidized to carboxyl groups by treating the cellulose with at least 4 parts of a mixture essentially consisting of liquid $NO_2$ and 10% of nitric acid.

GORDON D. HIATT.